(12) United States Patent
Hayashi

(10) Patent No.: US 12,466,218 B2
(45) Date of Patent: Nov. 11, 2025

(54) TIRE

(71) Applicant: BRIDGESTONE CORPORATION, Tokyo (JP)

(72) Inventor: Shintaro Hayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/850,558

(22) PCT Filed: Jan. 12, 2023

(86) PCT No.: PCT/JP2023/000676
§ 371 (c)(1),
(2) Date: Sep. 25, 2024

(87) PCT Pub. No.: WO2023/203816
PCT Pub. Date: Oct. 26, 2023

(65) Prior Publication Data
US 2025/0326256 A1 Oct. 23, 2025

(30) Foreign Application Priority Data
Apr. 19, 2022 (JP) ................................. 2022-068884

(51) Int. Cl.
*B60C 11/13* (2006.01)
*B60C 11/03* (2006.01)

(52) U.S. Cl.
CPC ....... *B60C 11/1315* (2013.01); *B60C 11/0304* (2013.01); *B60C 2011/0341* (2013.01);
(Continued)

(58) Field of Classification Search
CPC ... B60C 11/042; B60C 11/045; B60C 11/047; B60C 11/1315
See application file for complete search history.

(56) References Cited

U.S. PATENT DOCUMENTS 2,756,797 A 7/1956 Campbell
7,607,464 B2 10/2009 Murata
(Continued)

FOREIGN PATENT DOCUMENTS

DE 102013107343 A1 1/2015
DE 102020212455 A1 * 4/2022 ......... B60C 11/1323
(Continued)

OTHER PUBLICATIONS

Oct. 8, 2024, International Preliminary Report on Patentability issued in the International Patent Application No. PCT/JP2023/000676.
(Continued)

*Primary Examiner* — Robert C Dye
(74) *Attorney, Agent, or Firm* — KENJA IP LAW PC

(57) ABSTRACT

First and second groove walls 2a and 2b of a meandering main groove 21 have an upper and lower groove wall portion, respectively. The first groove wall 2a has the lower groove wall-top edge 2ale extending in a wavy line along the tire circumferential direction in order that a minimum groove wall angle portion and a maximum groove wall angle portion appear alternately. In the first groove wall 2a, the minimum groove wall angle portion and a wide groove section, and the maximum groove wall angle portion and a narrow groove section, respectively, are located at the same position in the tire circumferential direction. The upper groove wall-top edge 2aue of the first groove wall 2a extends in a straight line, a wavy line or a zigzag line with an amplitude smaller than an amplitude of the lower groove wall-top edge 2ale of the first groove wall 2a.

14 Claims, 7 Drawing Sheets

(52) U.S. Cl.
CPC ........... *B60C 2011/0348* (2013.01); *B60C 2011/0381* (2013.01); *B60C 2011/1361* (2013.01)

(56) References Cited

U.S. PATENT DOCUMENTS

| | | |
|---|---|---|
| 7,806,156 B2 | 10/2010 | Oh |
| 9,358,842 B2 | 6/2016 | Kato |
| 10,155,418 B2 | 12/2018 | Tanaka |
| 2006/0130950 A1* | 6/2006 | Murata ............... B60C 11/1323 152/209.24 |
| 2015/0343849 A1* | 12/2015 | Tanaka ............... B60C 11/1353 152/209.19 |
| 2017/0028791 A1 | 2/2017 | Tanaka |
| 2018/0015790 A1* | 1/2018 | Oji ....................... B60C 11/047 |
| 2021/0178826 A1 | 6/2021 | Lutz et al. |

FOREIGN PATENT DOCUMENTS

| | | |
|---|---|---|
| JP | 2006051936 A | 2/2006 |
| JP | 2006151029 A | 6/2006 |
| JP | 2010179892 A | 8/2010 |
| JP | 2011168222 A | 9/2011 |
| JP | 2011235701 A | 11/2011 |
| JP | 2012001075 A | 1/2012 |
| JP | 2012111342 A | 6/2012 |
| JP | 2016068635 A | 5/2016 |
| JP | 2017024687 A | 2/2017 |

OTHER PUBLICATIONS

Apr. 18, 2023, International Search Report issued in the International Patent Application No. PCT/JP2023/000676.

May 19, 2025, search result of the Extended European Search Report issued by the European Patent Office in the corresponding European Patent Application No. 23791473.4.

* cited by examiner

TIRE

TECHNICAL FIELD

This disclosure relates to a tire.

BACKGROUND

Many proposals have been made to control the hydroplaning phenomenon and to improve the drainage performance of tires. For example, PTL 1 proposes a tire in which both groove walls of a main groove are made to meander along the tire circumferential direction when viewed from the tread surface. According to the tire described in PTL 1, the drainage performance of the tire can be improved.

CITATION LIST

Patent Literature

PTL 1: JP 2010-179892 A1

SUMMARY

Technical Problem

However, tires such as those described in the above PTL 1 have a problem in that the compressive stiffness of a land portion forming the main groove varies greatly along the tire circumferential direction compared to tires in which the groove walls of a main groove extend in a straight line along the tire circumferential direction, and thus noise performance is easily deteriorated.

It is therefore an object of the present disclosure to provide a tire that can control the deterioration of noise performance while improving drainage performance.

Solution to Problem

The means to achieve the above objective is as follows.
(1) The tire of the present disclosure is,
a tire having one or more main grooves extending in a tire circumferential direction on a tread surface, wherein
at least one of the one or more main grooves is a meandering main groove in which at least part of groove surface extends, in a tread surface view, in a wavy line along the tire circumferential direction,
a first groove wall, which is a groove wall on one side in a tire width direction of the meandering main groove, and a second groove wall, which is a groove wall on the other side in the tire width direction of the meandering main groove, each has in a tire widthwise cross-section an upper groove wall portion extending from the tread surface in a straight line or in an arc of a constant curvature with a center of curvature on the groove side, and a lower groove wall portion extending in an arc of a constant curvature, which is larger than that of the upper groove wall portion, with a center of curvature on the groove side and is connected to the upper groove wall portion, and the upper groove wall portion is connected to a groove bottom via the lower groove wall portion,
when, in a tire widthwise cross-section, a groove wall angle of the upper groove wall portion on the tread surface relative to a normal line on the tread surface is referred to as an upper groove wall angle; an edge formed by connecting top ends, each of which is in the upper groove wall portion in a tire widthwise cross-section, to the tire circumferential direction, and an edge formed by connecting boundaries, each of which is between the upper groove wall portion and the lower groove wall portion in a tire widthwise cross-section, to the tire circumferential direction are referred to as an upper groove wall-top edge and a lower groove wall-top edge, respectively; and furthermore, a distance in the tire width direction between the lower groove wall-top edges in both of the groove walls of the meandering main groove is referred to as a groove wall spacing, the first groove wall of the meandering main groove has, in a tread surface view, the lower groove wall-top edge extending in a wavy line along the tire circumferential direction in order that a minimum groove wall angle portion where the upper groove wall angle is minimum and a maximum groove wall angle portion where the upper groove wall angle is maximum appear alternately at a predetermined repetition cycle along the tire circumferential direction, the second groove wall of the meandering main groove has, in a tread surface view, the lower groove wall-top edge extending in a wavy line along the tire circumferential direction, the minimum groove wall angle portion of the first groove wall of the meandering main groove and a wide groove section of the meandering main groove where the groove wall spacing is maximum are located at the same position in the tire circumferential direction, and the maximum groove wall angle portion of the first groove wall of the meandering main groove and a narrow groove section of the meandering main groove where the groove wall spacing is minimum are located at the same position in the tire circumferential direction, and in a tread surface view, the upper groove wall-top edge of the first groove wall of the meandering main groove extends in a straight line, a wavy line or a zigzag line along the tire circumferential direction with an amplitude in the tire width direction smaller than an amplitude in the tire width direction of the lower groove wall-top edge.

According to the tire of this disclosure, it is possible to control the deterioration of noise performance while improving drainage performance.

(2) In the tire described in (1) above,
it is preferable that the upper groove wall-top edge of the first groove wall of the meandering main groove extends, in a tread surface view, in a straight line along the tire circumferential direction.
(3) In the tire described in (1) above,
it is preferable that the upper groove wall angle in the maximum groove wall angle portion of the first groove wall of the meandering main groove is 250 or less.
It is also preferable to have the above configuration (3) in the tire described in (2) above.
(4) In the tire described in any one of (1) to (3) above,
it is preferable that the upper groove wall-top edge of the second groove wall of the meandering main groove extends in a wavy line along the tire circumferential direction.
It is also preferable to have the above configuration (4) in the tire described in (3) above having the above configuration (2).

(5) In the tire described in any one of (1) to (3) above,
it is preferable that an amplitude in the tire width direction of the lower groove wall-top edge of the first groove wall of the meandering main groove is smaller than an amplitude in the tire width direction of the lower groove wall-top edge of the second groove wall of the meandering main groove.

It is also preferable to have the above configuration (5) in the tire described in (3) above with the above configuration (2), and the tire described in (4) above with the above configuration (3).

(6) In the tire described in (1) above,
it is preferable to have a plurality of the main grooves, and of the plurality of the main grooves, the meandering main groove is the outermost main groove in the tire width direction on a vehicle-installed inside.

It is also preferable to have the above configuration (6) in the tire having at least one of the above configurations of (1) to (5).

Advantageous Effect

According to the present disclosure, it is possible to provide a tire that can control the deterioration of noise performance while improving drainage performance.

DETAILED DESCRIPTION

Figure 1:
FIG. 1 is a front view of a tire according to the first embodiment of this disclosure.

The tires according to the present disclosure can be suitably used for any type of pneumatic tires, for example, passenger vehicle pneumatic tires, truck and bus pneumatic tires, etc.

Hereinafter, embodiments of a tire according to the present disclosure will be described by way of example with reference to the drawings.

The same components and parts are designated by the same reference numerals/symbols in each drawing. In some drawings, the tire width direction is indicated by the symbol "WD", the tire circumferential direction by the symbol "CD", the vehicle-installed inside (the side that is on the inside of the vehicle in the tire width direction when the tire is mounted on the vehicle) by "IN", and the vehicle-installed outside (the side that is on the outside of the vehicle in the tire width direction when the tire is mounted on the vehicle) by "OUT".

Although detailed descriptions are omitted, the tires of the embodiments described below can be adopted with general tire structures which comprises: sidewall portions each extending outward in the tire radial direction from each of a pair of bead portions; a tread portion spanning between the two sidewall portions; a carcass having a carcass ply comprising, for example, organic fiber cords or steel cords extending from one bead portion through the tread portion to the other bead portion; and a belt layer comprising, for example, steel cords, arranged between the carcass and the tread rubber of the tread portion.

Hereafter, unless otherwise noted, the positional relationship and dimensions of each element shall be measured under the reference condition, with the tire mounted on an applicable rim, filled with a prescribed internal pressure, and unloaded. As used herein, the term "tread surface" refers to the entire circumference of the tire that is in contact with the road surface when the tire is mounted on the applicable rim, filled with the prescribed internal pressure, and loaded with maximum load. The width of the tread surface in the tire width direction is referred to herein as "tread width (TW)" and each of the edges of the tread surface in the tire width direction is referred to herein as "tread edge (TE)". Here, the dimensions of each element, such as a groove, on the tread surface shall be measured in a tread surface view. As used herein, the term "tread surface view" refers to a planar view of the tread surface with the tread surface developed on a plane.

As used herein, the term "applicable rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States. For sizes not listed in these industrial standards, the term "applicable rim" refers to a rim with a width corresponding to the bead width of the pneumatic tire. The "applicable rim" includes current sizes as well as sizes that will be specified in the aforementioned industrial standards in the future. An example of the "sizes that will be specified in the future" could be the sizes listed as "FUTURE DEVELOPMENTS" in the ETRTO 2013 edition.

As used herein, the "prescribed internal pressure" refers to the air pressure (maximum air pressure) corresponding to the maximum load capacity of a single wheel in the applicable size and ply rating, as described in the aforementioned JATMA YEAR BOOK and other industrial standards. In the case that the size is not listed in the aforementioned industrial standards, the "prescribed internal pressure" refers to the air pressure (maximum air pressure) corresponding to the maximum load capacity specified for each vehicle in which the tire is mounted. In addition, as used herein, the term "maximum load" means the load corresponding to the maximum load capacity in the tire of the applicable size described in the aforementioned industrial standards, or, for sizes not listed in the aforementioned industrial standards, the load corresponding to the maximum load capacity specified for each vehicle in which the tire is mounted.

First Embodiment

FIGS. 1 to 5 are drawings for explaining a tire 10 according to the first embodiment of the present disclosure.

Figure 2:
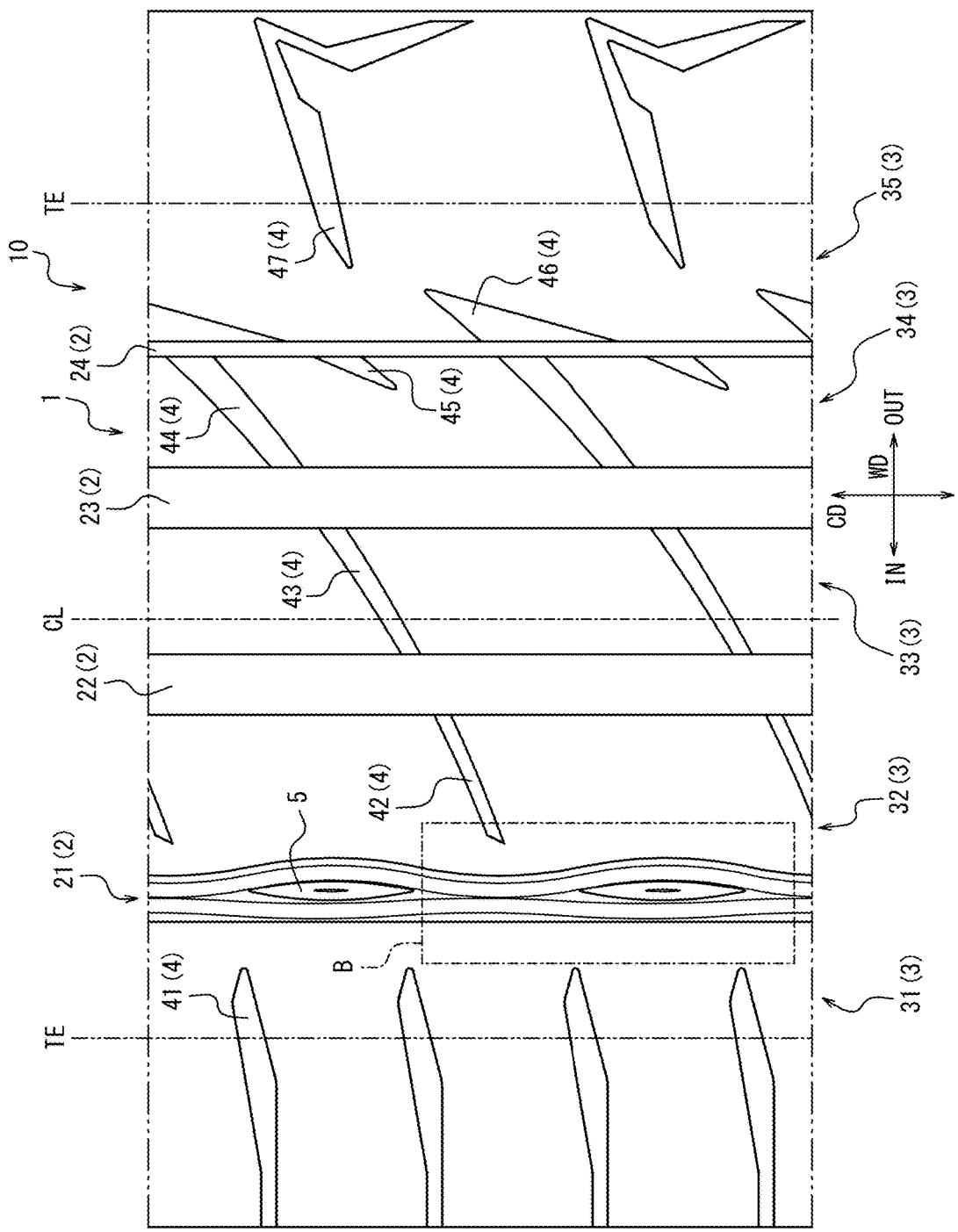
FIG. 2 is a development view of the tread surface of part A in FIG. 1, developed on a plane.
Figure 3:
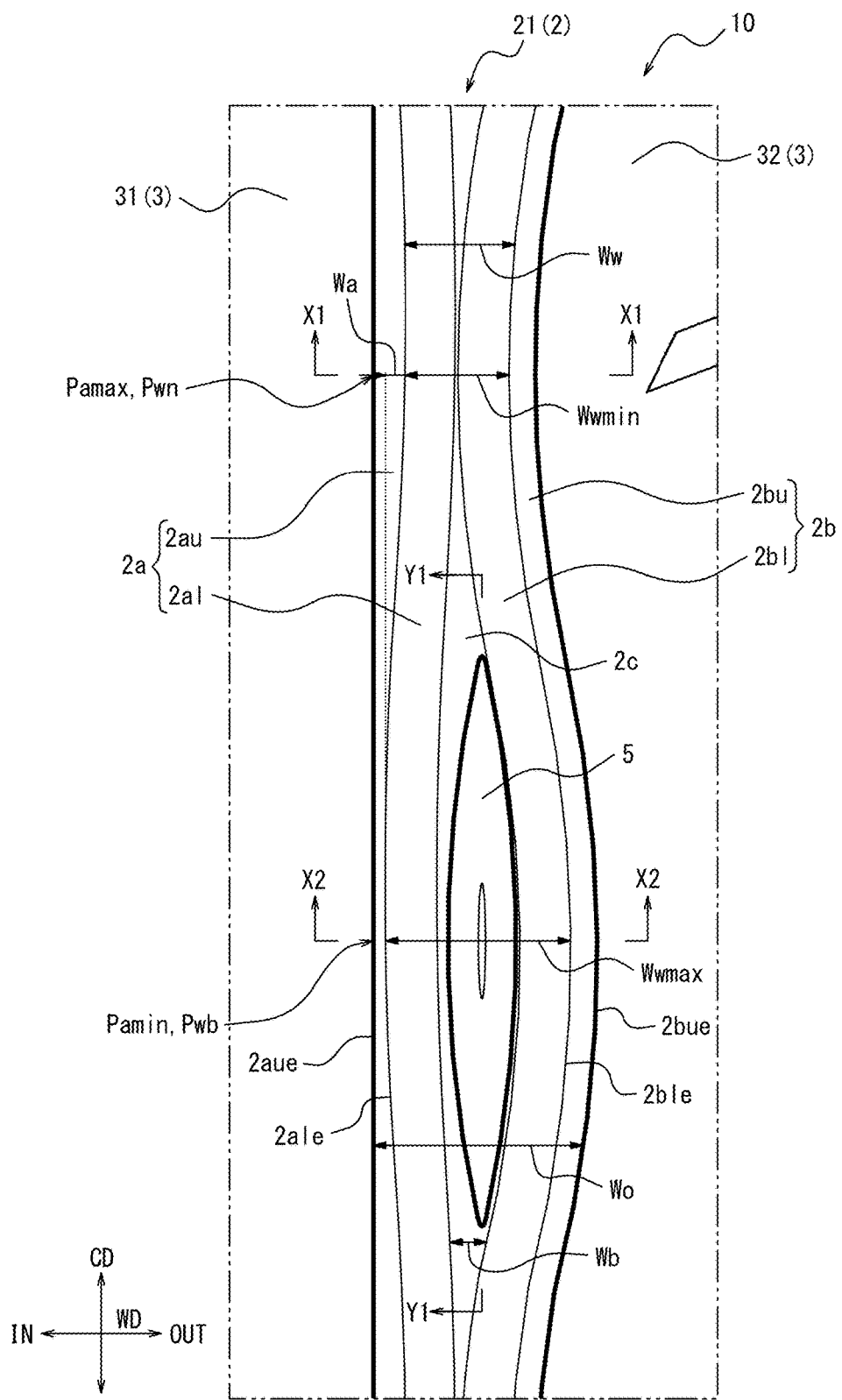
FIG. 3 is an enlarged view of part B in FIG. 2.
Figure 4A:
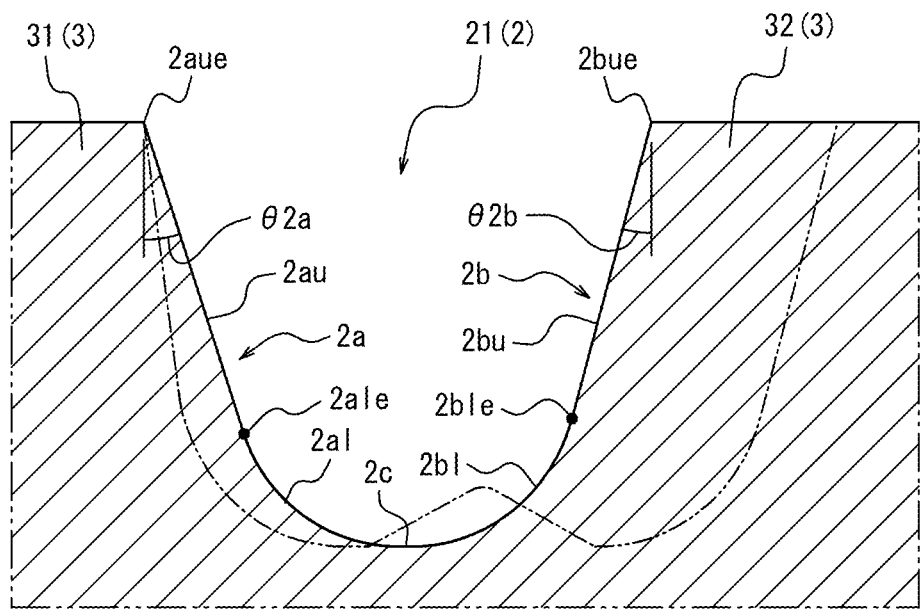
FIG. 4A is a cross-sectional view along the line X1-X1 in FIG. 3.
Figure 4B:
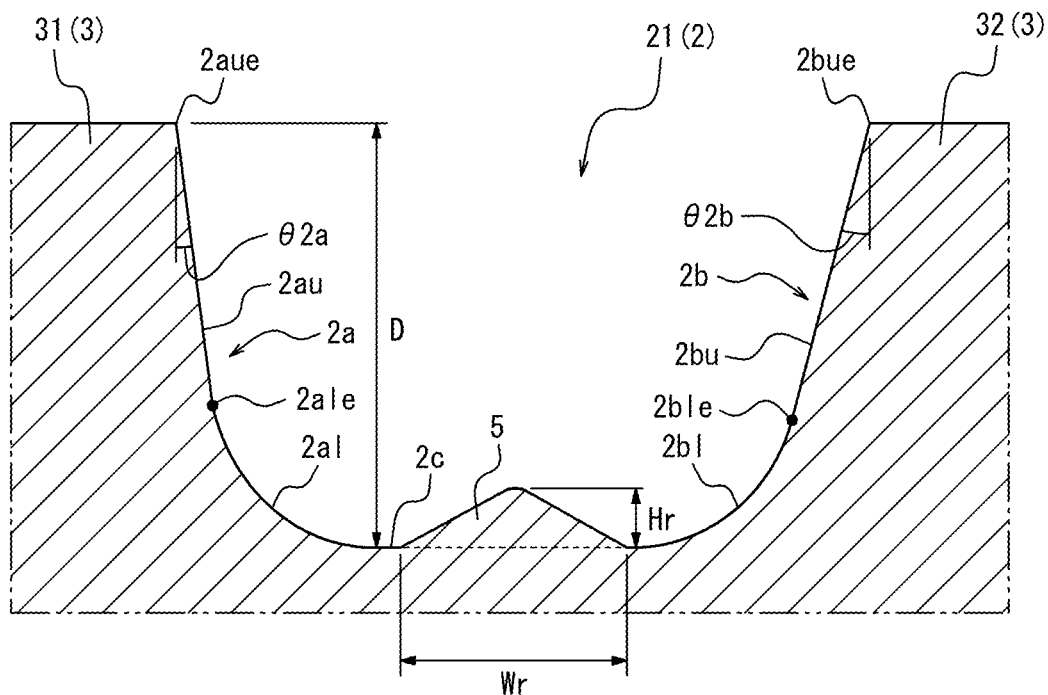
FIG. 4B is a cross-sectional view along the line X2-X2 in FIG. 3.
Figure 5:
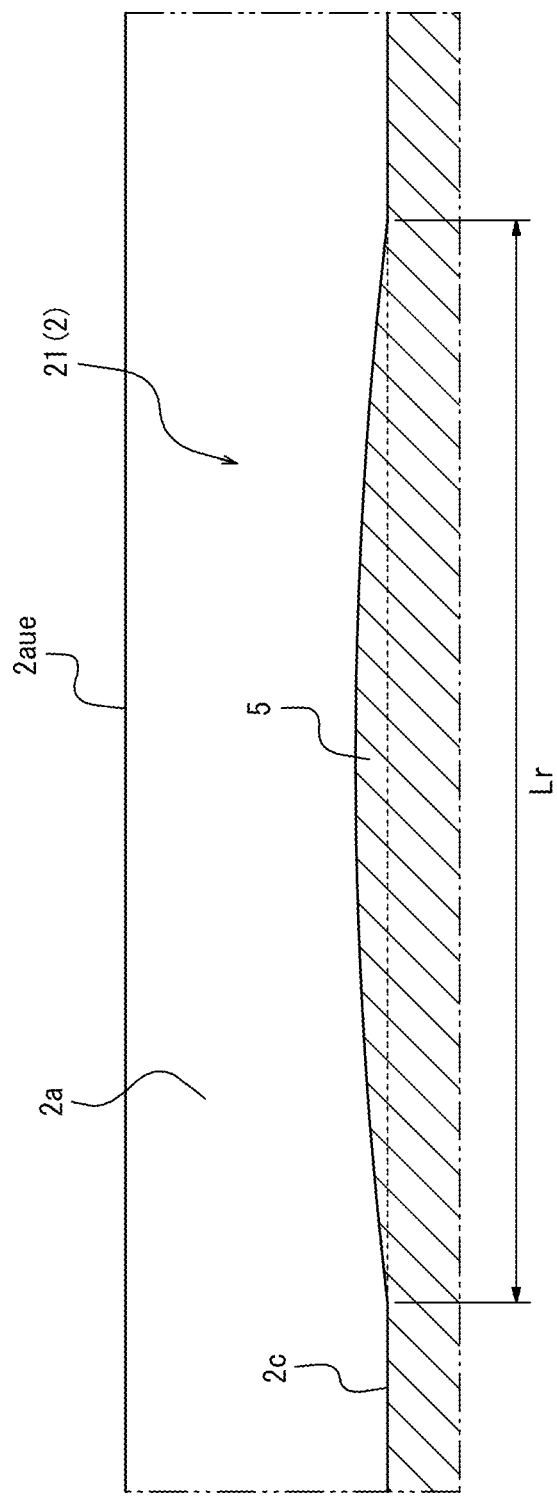
FIG. 5 is a cross-sectional view along the line Y1-Y1 in FIG. 3.

FIG. 1 is a front view of a tire according to the first embodiment of this disclosure. FIG. 2 is a development view of the tread surface of part A in FIG. 1, developed on a plane. FIG. 3 is an enlarged view of part B in FIG. 2. FIG. 4A is a cross-sectional view along the line X1-X1 in FIG. 3, FIG. 4B is a cross-sectional view along the line X2-X2 in FIG. 3, and FIG. 5 is a cross-sectional view along the line Y1-Y1 in FIG. 3. Here, in FIGS. 2 and 3, only a meandering main groove 21, described below, is depicted in detail not only at a groove opening but also inside the groove (the part on the inner side in the groove depth direction from the groove opening) for ease of understanding. In FIG. 3, also for ease of understanding, only two opening edges of the meandering main groove 21 to a tread surface 1 and the outline of a ridge 5 that rises from a groove bottom 2c are drawn with slightly thicker lines. The rather thin lines between them in FIG. 3 (and therefore in FIG. 2) are the edges (lines) formed by connecting the points, along the tire circumferential direction, where the curvature (and thus, radius of curvature) changes in a tire widthwise cross-section.

Note, that the tire 10 of this embodiment may be configured as any type of tire.

However, the tire 10 of this embodiment is configured as a tire for which the mounting direction on the vehicle is specified by stamping on the tire or in the instruction manual, etc.

As illustrated in FIGS. 1 and 2, the tire 10 of this embodiment has one or more (four in this example) main grooves 2 (21, 22, 23, and 24) extending in the tire circumferential direction on the tread surface 1.

Each of the main grooves 2 extends continuously throughout the entire tire circumferential direction. Each main groove 2, and more specifically, two opening edges of each main groove 2 to the tread surface 1, may extend in a straight line, a wavy line, or a zigzag line, etc., along the tire circumferential direction, as illustrated in FIG. 2, respectively, unless otherwise noted. Here, the description "extend (or extending) in a wavy line" in this document refers to extending while repeatedly folding at rounded bends; the description "extend (or extending) in a smooth wavy line" refers to extending while repeatedly folding at rounded bends and without any straight-line portions; and the description "extend (or extending)" in a zigzag line means extending while repeatedly bending at angular bends. In this document, the description "extend (or extending) in a wavy line" is also referred to as "meandering", and the description "extend (or extending) in a smooth wavy line" is also referred to as "smoothly meandering".

In this embodiment, the tire 10 has four main grooves 2 on the tread surface 1. However, at least one main groove 2 should be formed on the tread surface 1, for example, and there may be one to three, or five or more. Nevertheless, from the viewpoint of ensuring sufficient drainage performance, it is preferable to have a plurality of (two or more) main grooves 2, and from the viewpoint of achieving a good balance between drainage performance and steering stability, it is even more preferable to have three to five.

Here, in this embodiment, at least one (in the illustrated example, one) of the above-mentioned main grooves 2 is a meandering main groove in which at least part of groove surface extends, in a tread surface view, in a wavy line along the tire circumferential direction. In this embodiment, more specifically, as illustrated in FIGS. 1 and 2, of the plurality of (in the illustrated example, four) main grooves 2, the outermost main groove in the tire width direction on the vehicle-installed inside (The first main groove counted from the vehicle-installed innermost side. Hereinafter, also referred to as a "first main groove".) is a meandering main groove. Note, that the first main groove 21, which is the meandering main groove, is hereinafter also referred to simply as a meandering main groove 21.

The meandering main groove 21 will be described in detail later.

In this embodiment, more specifically, as illustrated in FIGS. 1 and 2, of the main grooves 2, the outermost main groove in the tire width direction on the vehicle-installed inside (first main groove) 21 is a meandering main groove as described above; the secondly located main groove from the outermost side in the tire width direction on the vehicle-installed inside (The second main groove counting from the vehicle-installed innermost side. Hereinafter, referred to as the "second main groove".) 22, the secondly located main groove from the outermost side in the tire width direction on the vehicle-installed outside (The third main groove counting from the vehicle-installed innermost side. Hereinafter, referred to as the "third main groove".) 23, and the outermost main groove in the tire width direction on the vehicle-installed outside (The fourth main groove counting from the vehicle-installed innermost side. Hereinafter, referred to as the "fourth main groove".) 24 are non-meandering main grooves that are not meandering main grooves, that is, they are main grooves in which at least part of the groove surface does not extend, in a tread surface view, in a wavy line along the tire circumferential direction. However, in this embodiment, at least one of the main grooves 2 may be a meandering main groove, for example, at least one of the second, third, and fourth main grooves 22, 23, and 24 may be a meandering main groove, instead of or in addition to the first main groove 21. Nevertheless, from the viewpoint of improving drainage performance, etc., it is preferable that at least the first main groove 21 be a meandering main groove, and from the viewpoint of both improving drainage performance and controlling the deterioration of noise performance, etc., it is more preferable that only the first main groove 21 be a meandering main groove, as in this embodiment.

As illustrated in FIGS. 1 and 2, the second main groove 22, the third main groove 23, and the fourth main groove 24, which are non-meandering main grooves, are all linear main grooves with both opening edges to the tread surface 1 extending in a straight line along the tire circumferential direction.

The tire widthwise width of the opening of each main groove 2 to the tread surface 1 (hereinafter, referred to as "groove opening width") Wo (the maximum value, if the groove opening width Wo varies in the tire circumferential direction) is not particularly limited, but can be from 4 to 15 mm, for example.

Similarly, the groove depth of each main groove 2, measured perpendicular to the tread surface 1 (hereinafter, also referred to as "groove depth") D (the maximum value, if the groove depth D varies) is not particularly limited, but can be 6 to 20 mm, for example.

As illustrated in FIGS. 1 and 2, the tire 10 of this embodiment has at least two (in the illustrated example, five) land portions 3 (31, 32, 33, 34, and 35) on the tread surface 1, and each of the main grooves 2 described above is formed between adjacent land portions 3 in the tire width direction, respectively.

In this embodiment, of the land portions 3, the outermost land portion in the tire width direction on the vehicle-installed inside (The first land portion counting from the vehicle-installed innermost side. Hereinafter, referred to as the "first land portion".) 31, the secondly located land portion from the outermost side in the tire width direction on the vehicle-installed inside (The second land portion counting from the vehicle-installed innermost side. Hereinafter, referred to as the "second land portion".) 32, and the outermost land portion in the tire width direction on the vehicle-installed outside (The first land portion counting from the vehicle-installed outermost side. Hereinafter, referred to as the "fifth land portion".) 35 are rib-shaped land portions, that are continuous in the tire circumferential direction. The land portion including the tire equatorial plane CL (The third land portion counting from the vehicle-installed innermost side. Hereinafter, referred to as the "third land portion".) 33, and the secondly located land portion from the outermost side in the tire width direction on the vehicle-installed outside (The forth land portion counting from the vehicle-installed innermost side. Hereinafter, referred to as the "forth land portion".) 34 are block-shaped land portions, where the land portions are divided in the tire circumferential direction by the lateral grooves 4 (more specifically, lateral groove 43 or 44) described below. However, each land portion 3 may be a rib-shaped land portion or a block-shaped land portion, respectively.

As illustrated in the examples in FIGS. 1 and 2, each land portion 3 may have a plurality of lateral grooves 4 extending in a direction that intersects the tire circumferential direction.

More specifically, in this embodiment, as illustrated in FIGS. 1 and 2, the first land portion 31 has a plurality of lateral grooves 41 extending from one end in the tire width direction (vehicle-installed inner end) of the first land portion 31 and terminating in the first land portion 31. The second land portion 32 has a plurality of lateral grooves 42 extending from the other end in the tire width direction (vehicle-installed outer end) of the second land portion 32 and terminating in the second land portion 32. The third land portion 33 has a plurality of lateral grooves 43 extending from one end in the tire width direction of the third land portion 33 across the third land portion 33 to the other end in the tire width direction of the third land portion 33. The fourth land portion 34 has a plurality of lateral grooves 44 extending from one end in the tire width direction of the fourth land portion 34 across the fourth land portion 34 to the other end in the tire width direction of the fourth land portion 34, and a plurality of lateral grooves 45 extending from the other end in the tire width direction (vehicle-installed outer end) of the fourth land portion 34 and terminating in the fourth land portion 34, which are alternating in the tire circumferential direction. The fifth land portion 35 has a plurality of lateral grooves 46 extending from one end in the tire width direction (vehicle-installed inner end) of the fifth land portion 35 and terminating in the fifth land portion 35, and a plurality of lateral grooves 47 extending from the other end in the tire width direction (vehicle-installed outer end) of the fifth land portion 35 and terminating in the fifth land portion 35, which are alternating in the tire circumferential direction. The configuration of these lateral grooves 4 (41 to 47) makes it possible to uniform the distribution of rigidity in the tire circumferential direction across the tread surface as a whole, which in turn contributes to improved noise performance, etc.

In particular, as illustrated in FIGS. 1 and 2, in this embodiment, the lateral grooves 42 in the second land portion 32, that is, the lateral grooves 42 that are connected to the main groove 22 which is adjacent to the meandering main groove 21 (more specifically, in the illustrated example, which is adjacent on the inner side in the tire width direction to the meandering main groove 21), extends within the second land portion 32 (more specifically, in the illustrated example, to the outer side in the tire width direction in the second land position 32) toward the vicinity of a narrow groove section Pwn, which will be described below, in the meandering main groove 21. In particular, this can make the distribution of rigidity uniform in the tire circumferential direction, which in turn contributes to improved noise performance, etc.

Furthermore, as illustrated in FIGS. 1 and 2, the lateral groove 42 in the second land portion 32 terminates within the second land portion 32, as described above. This can make the distribution of rigidity more uniform in the tire circumferential direction, which in turn contributes more to improved noise performance, etc.

However, the configuration of the lateral grooves 4 is optional, and at least some or all of the plurality of land portions 3 may not have the lateral grooves 4.

Next, the first main groove 21 (meandering main groove 21), which is considered the meandering main groove in this embodiment, is described in detail, also referring to FIGS. 3 through 5.

The meandering main groove 21 has at least a part of the groove surface extending, in a tread surface view, in a wavy line along the tire circumferential direction. More specifically, as illustrated in FIG. 3, in this embodiment, at least a part of the groove surface of the meandering main groove 21: the first groove wall 2a, the second groove wall 2b, and the groove bottom 2c, except for a upper groove wall-top edge 2aue of the first groove wall 2a, which will be described below (in the illustrated example, for example, a lower groove wall-top edge 2ale of the first groove wall 2a, the boundary edge between the first groove wall 2a and the groove bottom 2c, the boundary edge between the second groove wall 2b and the groove bottom 2c, a lower groove wall-top edge 2ble of the second groove wall 2b, and a upper groove wall-top edge 2bue of the second groove wall 2b, as described below, etc.), are extended in a wavy line, that is, meandering, along the tire circumferential direction.

In this embodiment, as illustrated in FIGS. 3, 4A, and 4B, the meandering main groove 21 is asymmetrical between the first groove wall 2a side and the second groove wall 2b side. That is, the meandering main groove 21 does not have an axis of symmetry extending in the tire circumferential direction.

In this embodiment, as illustrated in FIGS. 3, 4A, and 4B, a first groove wall 2a, which is a groove wall on one side in the tire width direction (in the illustrated example, the outer side in the tire width direction) of the meandering main groove 21, and a second groove wall 2b, which is a groove wall on the other side in the tire width direction (in the illustrated example, the inner side in the tire width direction) of the meandering main groove 21, each has in a tire widthwise cross-section an upper groove wall portion 2au, 2bu extending from the tread surface 1 in a straight line or in an arc of a constant curvature (inverse of radius of curvature) with a center of curvature on a groove side (more specifically, the main groove 2 (21) side, not the land portion 3 (31 or 32) side), and a lower groove wall portion 2al, 2bl extending in an arc of a constant curvature, which is larger than that of the upper groove wall portion 2au, 2bu, with a center of curvature on the groove side (more specifically, the main groove 2 (21) side, not the land portion 3 (31 or 32) side) and is connected to the upper groove wall portion 2au, 2bu, and the upper groove wall portion 2au, 2bu is connected to a groove bottom 2c via the lower groove wall portion 2al, 2bl.

In the example illustrated in FIGS. 4A and 4B, the upper groove wall portions $2au$ and $2bu$ extend from the tread surface 1 in a straight line (i.e., with curvature 0 and radius of curvature ∞) in a tire widthwise cross-section. However, in a tire widthwise cross-section, the upper groove wall portions $2au$ and $2bu$ may extend from the tread surface 1 in an arc of a constant curvature with a center of curvature on the groove side (in the illustrated example, on the meandering main groove 21 side) (that is, convex on the land portion side (in the illustrated example, on the first land portion 31 or the second land portion 32 side)). In addition, in the example illustrated in FIGS. 4A and 4B, as described above, in a tire widthwise cross-section, the lower groove wall portion $2al$ of the first groove wall $2a$ extends continuously from the upper groove wall portion $2au$, and is in an arc of a constant curvature with a center of curvature on the groove side (that is, convex on the land portion side (in the illustrated example, on the first land portion 31 side)), and the constant curvature is greater than the curvature of the upper groove wall portion $2au$ (0 in the illustrated example). Similarly, in the example illustrated in FIGS. 4A and 4B, in a tire widthwise cross-section, the lower groove wall portion $2bl$ of the second groove wall $2b$ extends continuously from the upper groove wall portion $2bu$, and is in an arc of a constant curvature with a center of curvature on the groove side (that is, convex on the land portion side (in the illustrated example, on the second land portion 32 side)), and the constant curvature is greater than the curvature of the upper groove wall portion $2bu$ (0 in the illustrated example).

Note, that in this embodiment, the upper groove wall portion $2au$ and the lower groove wall portion $2al$ of the first groove wall $2a$ have different curvatures (and thus, radius of curvature), but are connected smoothly at their boundary edge (the lower groove wall-top edge $2ale$, described below) (i.e., with a common tangent line at the boundary edge of the two (in the illustrated example, the straight upper groove wall portion $2au$ is tangent to the lower groove wall portion $2al$ at the lower groove wall-top edge $2ale$)). This results in a smooth connection between the upper groove wall portion $2au$ and the lower groove wall portion $2a1$. The same is true for the upper groove wall portion $2bu$ and the lower groove wall portion $2bl$ of the second groove wall $2b$.

In this embodiment, as described above, the upper groove wall portions $2au$ and $2bu$ of the first and second groove walls $2a$ and $2b$ are connected to the groove bottom $2c$ via the lower groove wall portions $2al$ and $2bl$, respectively, as illustrated in FIGS. 4A and 4B. That is, the upper groove wall portions $2au$ and $2bu$ are smoothly connected to the groove bottom $2c$ through the lower groove wall portions $2al$ and $2bl$ extending in an arc of a certain curvature with a center of curvature on the groove side continuously from the upper groove wall portions $2au$ and $2bu$, respectively. In this embodiment, as illustrated, the groove bottom $2c$ extends continuously from the lower groove wall portions $2al$ and $2bl$ in a tire widthwise cross-section. However, the upper groove wall portions $2au$ and $2bu$ may be connected to the groove bottom $2c$ via further groove wall portions of similar configuration to the lower groove wall portions $2al$ and $2bl$, with a curvature greater than that of the lower groove wall portions $2al$ and $2bl$, extending downward in the groove depth direction from the lower groove wall portions $2al$ and $2bl$, respectively. Nevertheless, from the perspective of simpler construction of the meandering main groove 2, etc., it is preferable that the upper groove wall portions $2au$ and $2bu$ are connected to the groove bottom $2c$ via only the lower groove wall portions $2a1$ and $2bl$, respectively, as in the illustrated example.

In this embodiment, in a tire widthwise cross-section, the upper groove wall portion $2au$ and the groove bottom $2c$ of the first groove wall $2a$ are smoothly connected at their boundary edge (That is, they have a common tangent line at their boundary edge. (In the illustrated example, the straight groove bottom $2c$ is tangent to the lower groove wall portion $2al$ at the above boundary edge.)). This results in a smooth connection between the lower groove wall portion $2al$ and the groove bottom $2c$. The same is true for the lower groove wall portion $2bl$ and the groove bottom $2c$ of the second groove wall $2b$.

Here, the term "groove bottom ($2c$)" in this document refers to the portion of the groove surface where the groove depth is the greatest. The groove bottom $2c$ may have a width in the tire width direction (≠0) or may not have a width in the tire width direction (i.e., the width in the tire width direction may be 0) at each position in the tire circumferential direction. That is, the groove bottom $2c$ does not have a width in the tire width direction, and thus the deepest part of the lower groove wall portion $2al$, $2bl$ in the groove depth direction may be the groove bottom $2c$, for example. In this embodiment, as illustrated in FIGS. 3, 4A, and 4B, the groove bottom $2c$ has a width in the tire width direction (≠0) at each position in the tire circumferential direction. When the groove bottom $2c$ has a width in the tire width direction (≠0), the groove bottom $2c$ is in a straight line (i.e., curvature 0, radius of curvature ∞) in a tire widthwise cross-section.

In this embodiment, as described above, the upper groove wall portion $2au$ and the lower groove wall portion $2al$ of the first groove wall $2a$ are smoothly connected at their boundary edge (the lower groove wall-top edge $2ale$, described below) in a tire widthwise cross-section. Thus, the height of the lower groove wall-top edge $2ale$ at a minimum groove wall angle portion Pamin (see FIG. 4B), described below, of the first groove wall $2a$ from the groove bottom $2c$ is higher than the height of the lower groove wall-top edge $2ale$ at a maximum groove wall angle portion Pamax (see FIG. 4A), described below, of the first groove wall $2a$ from the groove bottom $2c$.

On the other hand, in this embodiment, the height of the lower groove wall-top edge $2ble$ (see FIGS. 4A and 4B) of the second groove wall $2b$, described below, from the groove bottom $2c$ is constant along the tire circumferential direction. In this embodiment, the height of the lower groove wall-top edge $2ble$ of the second groove wall $2b$ from the groove bottom $2c$ is: lower than the height of the lower groove wall-top edge $2ale$ at the minimum groove wall angle portion Pamin of the first groove wall $2a$ described above from the groove bottom $2c$, and higher than the height of the lower groove wall-top edge $2ale$ at the maximum groove wall angle portion Pamax of the first groove wall $2a$ described above from the groove bottom $2c$.

Referring now to FIGS. 3, 4A, and 4b, in the present disclosure, in a tire widthwise cross-section, a groove wall angle of the upper groove wall portion ($2au$ and $2bu$) on the tread surface 1 (in other words, at the upper groove wall-top edges $2aue$ and $2bue$, described below) relative to the normal line on the tread surface 1 is referred to as "an upper groove wall angle ($θ2a$ and $θ2b$)"; an edge formed by connecting top ends, each of which is in the upper groove wall portion in a tire widthwise cross-section, to the tire circumferential direction (i.e., both groove opening edges to the tread surface), and an edge formed by connecting boundaries, each of which is between the upper groove wall portion ($2au$ and $2bu$) and the lower groove wall portion ($2al$ and $2bl$) in a tire widthwise cross-section, to the tire circumferential direction are referred to as "an upper groove wall-top edge (2*aue* and 2*bue*)" (i.e., both groove openings to the tread surface) and "a lower groove wall-top edge (2*ale* and 2*ble*)", respectively; and furthermore, a distance in the tire width direction between the top edges of lower groove walls (2*ale* and 2*ble*) in both of groove walls (2*a* and 2*b*) of the meandering main groove 21 is referred to as "a groove wall spacing (Ww)". Here, the upper groove wall angles θ2*a* and θ2*b* are considered as: positive when the upper groove wall portion 2*au* or 2*bu*, respectively, slopes closer to the groove side (in the illustrated example, to the meandering main groove 21 side) as it moves from the upper groove wall-top edge 2*aue* or 2*bue* to the groove bottom 2*c*, as illustrated in FIGS. 4A and 4B; and negative when it slopes closer to the land portion (in the illustrated example, the first land portion 31 or the second land portion 32), and when determining the relationship between the angles of the upper groove wall portion 2*au* or 2*bu* at each location in the tire circumferential direction, such positive or negative shall be considered.

In this embodiment, as illustrated in FIGS. 3, 4A, and 4B, the first groove wall 2*a* of the meandering main groove 21 has the lower groove wall-top edge 2*ale* extending, in a tread surface view, in a wavy line (i.e., with repeated bending at the rounded bends) along the tire circumferential direction, that is, meandering along the tire circumferential direction, in order that the minimum groove wall angle portion Pamin where the upper groove wall angle θ2*a* is minimum and a maximum groove wall angle portion Pamax where the upper groove wall angle θ2*a* is maximum appear alternately at a predetermined repetition cycle along the tire circumferential direction. Here, the "minimum groove wall angle portion (Pamin and Pbmin)" herein refers to the location in the tire circumferential direction in the meandering main groove where the upper groove wall angle (θ2*a* and θ2*b*) is the minimum, and the "maximum groove wall angle portion (Pamax and Pbmax)" refers to the location in the tire circumferential direction in the meandering main groove where the upper groove wall angle (θ2*a* and θ2*b*) is the maximum. FIGS. 4A and 4B illustrate a tire widthwise cross-section of the meandering main groove 21 at the maximum groove wall angle portion Pamax and the minimum groove wall angle portion Pamin of the first groove wall 2*a*, respectively.

Note, that in this embodiment, the above-mentioned upper groove wall angle θ2*a* varies smoothly along the tire circumferential direction between the minimum groove wall angle portion Pamin and the maximum groove wall angle portion Pamax.

In this embodiment, the above "predetermined repetition cycle" is constant in the tire circumferential direction. However, the above "predetermined repetition cycle" may vary in the tire circumferential direction. Nevertheless, from the viewpoint of rigidity balance in the tire circumferential direction, it is preferable that the above "predetermined repetition cycle" be constant in the tire circumferential direction. In addition, in this embodiment, as illustrated in FIG. 3, the lower groove wall-top edge 2*ale* extends in a smooth wavy line along the tire circumferential direction (i.e., with repeated bending at the rounded bends and without any straight portions) in a tread surface view, that is, it meanders smoothly along the tire circumferential direction. However, the lower groove wall-top edge 2*ale* need only extend in a wavy line and need not extend in a smooth wavy line. Nevertheless, from the perspective of more effective rectification for better drainage performance, etc., it is preferable that the lower groove wall-top edge 2*ale* be extended in a smooth wavy line.

Note, that in this embodiment, as illustrated in FIG. 3, the lower groove wall-top edge 2*ale* of the first groove wall 2*a* and the boundary edge between the lower groove wall portion 2*al* and the groove bottom 2*c* extend in a wavy line (meander) along the tire circumferential direction so that they are farthest from the second groove wall 2*b* side at the minimum groove wall angle portion Pamin and closest to the second groove wall 2*b* side at the maximum groove wall angle portion Pamax. In other words, in this embodiment, the lower groove wall-top edge 2*ale* of the first groove wall 2*a* and the boundary edge between the lower groove wall portion 2*al* and the groove bottom 2*c* extend along the tire circumferential direction with the same repetition cycle as each other.

In this embodiment, the upper groove wall angle θ2*a* at the maximum groove wall angle portion Pamax of the first groove wall 2*a* of the meandering main groove 21 (see FIG. 4A) is preferably 25° or less, and more preferably 20° or less. Also, the upper groove wall angle θ2*a* is preferably 10° or more, and more preferably 15° or more. If the upper groove wall angle θ2*a* at the maximum groove wall angle portion Pamax is 25° or less, the groove cross-sectional area will not be smaller than necessary, which in turn ensures sufficient drainage performance, and if the angle is 10° or more, the rigidity of the adjacent land portions can be ensured. In the example illustrated in FIG. 4A, the upper groove wall angle θ2*a* is set at about 17°.

In addition, the upper groove wall angle θ2*a* at the minimum groove wall angle portion Pamin of the first groove wall 2*a* of the meandering main groove 21 (see FIG. 4B) is preferably 15° or less, and more preferably 10° or less. Also, the upper groove wall angle θ2*a* is preferably 0° or more, and more preferably 5° or more. If the upper groove wall angle θ2*a* at the minimum groove wall angle portion Pamax is 15° or less, the groove cross-sectional area will not be smaller than necessary, which in turn ensures sufficient drainage performance, and if the angle is 0° or more, the rigidity of the adjacent land portions can be ensured. In the example illustrated in FIG. 4B, the upper groove wall angle θ2*a* is set at about 7°.

In this embodiment, as illustrated in FIGS. 3, 4A, and 4B, like the first groove wall 2*a* described above, the second groove wall 2*b* of the meandering main groove 21 also has the lower groove wall-top edge 2*ble* extending, in a tread surface view, in a wavy line (i.e., with repeated bending at the rounded bends) along the tire circumferential direction. In this embodiment, however, the second groove wall 2*b* differs from the first groove wall 2*a* described above in that the upper groove wall angle θ2*b* does not vary in the tire circumferential direction and is constant. However, the second groove wall 2*b* may have the upper groove wall angle θ2*b* vary in the tire circumferential direction, as in the second embodiment described below with reference to FIGS. 6 to 7.

Note, that in this embodiment, as illustrated in FIG. 3, as well as the first groove wall 2*a*, the lower groove wall-top edge 2*ble* of the second groove wall 2*b* and the boundary edge between the lower groove wall portion 2*bl* and the groove bottom 2*c* extend in a wavy line (meander) along the tire circumferential direction so that they are farthest from the first groove wall 2*a* side at the minimum groove wall angle portion Pamin and closest to the first groove wall 2*a* side at the maximum groove wall angle portion Pamax. In other words, in this embodiment, the lower groove wall-top edge 2*ble* of the second groove wall 2*b* and the boundary edge between the lower groove wall portion 2*bl* and the groove bottom 2c extend along the tire circumferential direction with the same repetition cycle as each other.

In this embodiment, the lower groove wall-top edge 2ble of the second groove wall 2b extends, in a tread surface view, in a wavy pattern along the tire circumferential direction, and the manner of such extension is similar to that described above for the lower groove wall-top edge 2ale of the first groove wall 2a, except for the amplitude in the tire width direction as described below. Therefore, we omit the description thereof.

Note, that in this embodiment, the upper groove wall angle θ2b (which is constant) of the second groove wall 2b of the meandering main groove 21 can be, for example, 10° to 20°, more specifically, 13° to 17°, etc.

Here, in this embodiment, in the first groove wall 2a, when points on the first groove wall 2a, except for on the upper groove wall-top edge 2aue of the first groove wall 2a (i.e., the one-sided opening edge to the tread surface 1 of the meandering main groove 21), at any height from the groove bottom 2c are connected in the tire width direction to form a line, the line extends (meanders), in a tread surface view, in a wavy line along the tire circumferential direction (When the upper groove wall-top edge 2aue extends in a wavy or zigzag line, the above line extends, in a tread surface view, along the tire circumferential direction with an amplitude greater than the amplitude in the tire width direction at the upper groove wall-top edge 2aue.). For example, a line formed by connecting the points, along the tire width direction, on the first groove wall 2a whose height from the groove bottom 2c is 10% of the groove depth (maximum depth) D extends (meanders), in a tread surface view, in a wavy line along the tire circumferential direction. In other words, the entire first groove wall 2a, except for the upper groove wall-top edge 2aue, extends (meanders) in a wavy manner (When the upper groove wall-top edge 2aue extends in a wavy or zigzag line, the groove wall extends, in a tread surface view, along the tire circumferential direction with an amplitude greater than the amplitude in the tire width direction at the upper groove wall-top edge 2aue.).

Also, in this embodiment, in the second groove wall 2b, when points on the second groove wall 2b at any height from the groove bottom 2c are connected in the tire width direction to form a line, the line extends (meanders), in a tread surface view, in a wavy line along the tire circumferential direction. For example, a line formed by connecting the points, along the tire circumferential direction, on the second groove wall 2b whose height from the groove bottom 2c is 10% of the groove depth (maximum depth) D extends (meanders), in a tread surface view, in a wavy line along the tire circumferential direction. In other words, the entire second groove wall 2b, except for the upper groove wall-top edge 2bue, extends (meanders) in a wavy manner.

The above configuration in this embodiment ensures a more reliable drainage performance.

In this embodiment, the amplitude in the tire width direction at the lower groove wall-top edge 2ale of the first groove wall 2a of the meandering main groove 21 is smaller than the amplitude in the tire width direction at the lower groove wall-top edge 2ble of the second groove wall 2b of the meandering main groove 21. Here, the "amplitude in the tire width direction" of the upper groove wall-top edge or the lower groove wall-top edge, etc., as used herein, refers to the distance in the tire width direction between the tire widthwise position when the edge, etc., extending in the tire circumferential direction, is at its most land portion side and the tire widthwise position when the edge, etc., is at its most groove side, in a tread surface view (for an example, see the sign "Wa" in FIG. 3).

In this embodiment, as illustrated in FIG. 3, the minimum groove wall angle portion Pamin of the first groove wall 2a of the meandering main groove 21 and a wide groove section Pwb of the meandering main groove 21 where the groove wall spacing Ww (the distance in the tire width direction between the lower groove wall-top edge 2ale of the first groove wall 2a and the lower groove wall-top edge 2ble of the second groove wall 2b) is maximum are located at the same position in the tire circumferential direction, and the maximum groove wall angle portion Pamax of the first groove wall 2a of the meandering main groove 21 and a narrow groove section Pwn of the meandering main groove 21 where the groove wall spacing Ww is minimum are located at the same position in the tire circumferential direction. Here, the "wide groove section Pwb" refers, in other words, to the position in the tire circumferential direction in the meandering main groove 21 where the groove wall spacing Ww has the maximum value Wwmax, and the "narrow groove section Pwn" refers, in other words, to the position in the tire circumferential direction in the meandering main groove 21 where the groove wall spacing Ww has the minimum value Wwmin.

As mentioned above, in this embodiment, the minimum groove wall angle portion Pamin of the first groove wall 2a of the meandering main groove 21 is located in the same position in the tire circumferential direction as the wide groove section Pwb, and the maximum groove wall angle portion Pamax of the first groove wall 2a of the meandering main groove 21 is located in the same position in the tire circumferential direction as the narrow groove section Pwn. In other words, in this embodiment, as illustrated in FIG. 3, the lower groove wall-top edge 2ale of the first groove wall 2a and the lower groove wall-top edge 2ble of the second groove wall 2b extend (meandering) in a wavy line along the tire circumferential direction, with the same repetition cycle but 180° out of phase with each other.

Note, that the above "same position in the tire circumferential direction" means that the position should be substantially the same. For example, a deviation in the tire circumferential direction of 5% or less of the repetition cycle (length in the tire circumferential direction) of the aforementioned upper groove wall angle θ2a shall be allowed.

In this embodiment, as illustrated in FIG. 3, in a tread surface view, the upper groove wall-top edge 2aue of the first groove wall 2a of the meandering main groove 21 (that is, one of the two opening edges (i.e., in the illustrated example, on the outer side in the tire width direction) to the tread surface 1 of the meandering main groove 21) extends in a straight line, a wavy line or a zigzag line along the tire circumferential direction with an amplitude in the tire width direction smaller than an amplitude in the tire width direction of the lower groove wall-top edge 2ale of the first groove wall 2a.

More specifically, in this embodiment, as illustrated in FIG. 3, the upper groove wall-top edge 2aue of the first groove wall 2a of the meandering main groove 21 extends in a straight line (i.e., with amplitude in the tire width direction 0) along the tire circumferential direction in a tread surface view. However, the upper groove wall-top edge 2aue of the first groove wall 2a may extend in a wavy or zigzag line along the tire circumferential direction, as long as the amplitude in the tire width direction thereof is smaller than the amplitude Wa in the tire width direction of the lower groove wall-top edge 2ale. Nevertheless, from the viewpoint of more effectively controlling the deterioration of noise performance, etc., it is preferable that the upper groove wall-top edge 2*aue* of the first groove wall 2*a* extends in a straight line along the tire circumferential direction.

In addition, in this embodiment, as illustrated in FIG. 3, the upper groove wall-top edge 2*bue* of the second groove wall 2*b* of the meandering main groove 21 (that is, the other side (i.e., in the illustrated example, on the inner side in the tire width direction) of the two opening edges to the tread surface 1 of the meandering main groove 21) extends in a wavy line (more specifically, in a smooth wavy line) along the tire circumferential direction in a tread surface view. However, as in the second embodiment described below with reference to FIGS. 6 to 7, the upper groove wall-top edge 2*bue* of the second groove wall 2*b* may extend in a straight line, for example, along the tire circumferential direction. Nevertheless, from the viewpoint of more effectively improving drainage performance, etc., it is preferable that the upper groove wall-top edge 2*bue* of the second groove wall 2*b* extends in a wavy line along the tire circumferential direction.

Here, in this embodiment, as described above, as illustrated in FIG. 3, in a tread surface view, the upper groove wall-top edge 2*aue* of the first groove wall 2*a* of the meandering main groove 21 (i.e., the opening edge to the tread surface 1 of the meandering main groove 21 on the outer side in the tire width direction) extends in a straight line along the tire circumferential direction, while the upper groove wall-top edge 2*bue* of the second groove wall 2*b* of the meandering main groove 21 (i.e., the opening edge to the tread surface 1 of the meandering main groove 21 on the inner side in the tire width direction) extends in a wavy line along the tire circumferential direction. In other words, in this embodiment, the opening edges (2*aue* and 2*bue*) to the tread surface 1 of the meandering main groove 21 are: in a straight line on the opening edge on the outer side in the tire width direction (2*aue*), while in a wavy line on the opening edge on the inner side in the tire width direction (2*bue*). In this case, when the rigidity of the land portion in the tire circumferential direction varies, only the opening edge adjacent to the land portion on the outer side in the tire width direction (i.e., the shoulder side of the tire), where uneven wear is more likely to occur than on the inner side in the tire width direction, is made straight, which prevents the rigidity in the tire circumferential direction of the adjacent land portion from varying, thereby improving drainage performance while effectively controlling the deterioration of not only noise performance but also anti-uniform wear performance.

In addition, in this embodiment, as illustrated in FIG. 3, the upper groove wall-top edge 2*bue* of the second groove wall 2*b* of the meandering main groove 21 (i.e., the opening edge on the other side (i.e., on the inner side in the tire width direction, in the illustrated example) of the two opening edges to the tread surface 1 of the meandering main groove 21) extends in a wavy line along the tire circumferential direction so that it is farthest from the first groove wall 2*a* side at the minimum groove wall angle portion Pamin of the first groove wall 2*a* and closest to the first groove wall 2*a* side at the maximum groove wall angle portion Pamax of the first groove wall 2*a*. In other words, in this embodiment, the upper groove wall-top edge 2*bue* of the second groove wall 2*b* extends along the tire circumferential direction with the same repetition cycle as: the lower groove wall-top edge 2*ale* of the first groove wall 2*a*; the boundary edge between the lower groove wall portion 2*al* of the first groove wall 2*a* and the groove bottom 2*c*; the lower groove wall-top edge 2*ble* of the second groove wall 2*b*; and the boundary edge between the lower groove wall portion 2*bl* of the second groove wall 2*b* and the groove bottom 2*c*.

Furthermore, in this embodiment, as illustrated in FIG. 3, the position in the tire circumferential direction where the meandering main groove 21 has the maximum groove opening width Wo is located in the wide groove section Pwb (and thus, the minimum groove wall angle portion Pamin), and the position in the tire circumferential direction where the meandering main groove 21 has the minimum groove opening width Wo is located in the narrow groove section Pwn (and thus, the maximum groove wall angle portion Pamax). Also, the position in the tire circumferential direction where the meandering main groove 21 has the maximum groove bottom width Wb is located in the wide groove section Pwb (and thus, the minimum groove wall angle portion Pamin), and the position in the tire circumferential direction where the meandering main groove 21 has the minimum groove bottom width Wb is located in the narrow groove section Pwn (and thus, the maximum groove wall angle portion Pamax).

Here, in this embodiment, Womax/Womin, the ratio of the maximum value Womax to the minimum value Womin of the groove opening width Wo of the meandering main groove 21 is preferably 1.25 to 1.50, and more preferably 1.30 to 1.45, from the viewpoint of more effectively balancing improved drainage and secured rigidity of the land portion. In the example illustrated in FIGS. 3 to 4, Womax/Womin is set at about 1.38.

In this embodiment, as illustrated in FIG. 3, in the meandering main groove 21, the groove opening width Wo is larger than the groove wall spacing Ww at all positions in the tire circumferential direction. Similarly, in the meandering main groove 21, the groove opening width Wo is larger than the groove bottom width Wb at all positions in the tire circumferential direction. Each of these configurations ensures sufficient rigidity of the land portion 3 adjacent to the meandering main groove 21.

In this embodiment, as illustrated in FIGS. 3, 4A, 4B, and 5, the meandering main groove 21 has a ridge 5 at the groove bottom 2*c* that rises toward the outer side in the tire radial direction. In this embodiment, the ridge 5 is formed in the area including the wide groove section Pwb in the tire circumferential direction.

Thus, in this embodiment, the ridge 5 is formed in the groove bottom 2*c* in the area including the wide groove section Pwb of the meandering main groove 21 so that it rises toward the outer side in the tire radial direction. As a result, water flowing near the wide groove section Pwb in the meandering main groove 21 can easily flow along the first and second groove walls 2*a* and 2*b* due to the ridge 5, which in turn effectively improves drainage performance.

However, the meandering main groove 21 does not have to have a ridge 5. Nevertheless, from the perspective of effectively improving drainage performance, the meandering main groove 21 preferably has a ridge 5, as in this embodiment.

In this embodiment, as illustrated in FIG. 3, in a tread surface view, the side edge of the ridge 5 on the first groove wall 2*a* side extends in a curved line, approximately along the first groove wall 2*a* (more specifically, the lower groove wall-top edge 2*ale* of the first groove wall 2*a*, and the boundary edge between the lower groove wall portion 2*al* of the first groove wall 2*a* and the groove bottom 2*c*, etc.), and also the side edge of the ridge 5 on the second groove wall 2*b* side extends in a curved line, approximately along with the second groove wall 2*b* (more specifically, the lower groove wall-top edge 2ble of the second groove wall 2b, and the boundary edge between the lower groove wall portion 2bl of the second groove wall 2b and the groove bottom 2c, etc.).

The above configuration of the ridge 5 allows water flowing near the wide groove section Pwb in the meandering main groove 21 to flow more easily along the first and second groove walls 2a and 2b, which in turn improves drainage performance.

In this embodiment, as illustrated in FIG. 3, the ridge 5 is formed, in a tread surface view, in a shape that is longitudinal along the tire circumferential direction, with the length (maximum length) in the tire circumferential direction Lr (see FIG. 5) longer than the width (maximum width) in the tire width direction Wr (see FIG. 4B). More specifically, the ridge 5 is formed, in a tread surface view, in a longitudinal shape with the width in the tire width direction gradually narrowing toward both ends of the ridge 5 in the tire circumferential direction. In addition, in this embodiment, the ridge 5 is formed in an abbreviated triangular shape in a tire widthwise cross-section, as illustrated in FIG. 4B, with the height of the ridge 5 from the groove bottom 2c decreasing toward both ends of the ridge 5 in the tire width direction. Furthermore, in this embodiment, the ridge 5 is formed in an abbreviated triangular shape in a cross-sectional view in the tire circumferential direction, as illustrated in FIG. 5, with the height of the ridge 5 from the groove bottom 2c gradually decreasing toward both ends of the ridge 5 in the tire circumferential direction.

Due to the above respective configurations of the ridge 5, water flowing near the wide groove section Pwb in the meandering main groove 21 is not abruptly changed in flow by the ridge 5, and can flow more easily along the first and second groove walls 2a and 2b, which in turn further improves drainage performance.

The height (maximum height) Hr of the ridge 5 from the groove bottom 2c (see FIG. 4B) is not particularly limited, but is preferably less than $\frac{1}{5}$ of the groove depth (maximum depth) D (see FIG. 4B) of the meandering main groove 21. In this case, the cross-sectional area of the meandering main groove 21 is not reduced more than necessary due to the presence of the ridge 5, which in turn ensures sufficient drainage performance.

In addition, the width (maximum width) Wr (see FIG. 4B) in the tire width direction of the ridge 5 is not particularly limited, but is preferably less than $\frac{1}{2}$ of the groove opening width (maximum width) Wo of the meandering main groove 21. In this case, the cross-sectional area of the meandering main groove 21 is not reduced more than necessary due to the presence of the ridge 5, which in turn ensures sufficient drainage performance.

The main effects of the first embodiment of the present disclosure described above are then summarized below, again as necessary.

First, in this embodiment, at least one of the main grooves 2 is a meandering main groove in which at least part of the groove surface extends, in a tread surface view, in a wavy line along the tire circumferential direction. This makes it easier to control the turbulence of water flowing in the main groove and to rectify the flow, thereby controlling the hydroplaning phenomenon and improving drainage performance.

In addition, in this embodiment, the first groove wall 2a and the second groove wall 2b in the meandering main groove 21 each has in a tire widthwise cross-section the upper groove wall portion 2au extending from the tread surface in a straight line or in an arc of a constant curvature with a center of curvature on the groove side, and a lower groove wall portion 2al extending in an arc of a constant curvature, which is larger than that of the upper groove wall portion 2au, with a center of curvature on the groove side and is connected to the upper groove wall portion 2au, and the upper groove wall portion 2au is connected to the groove bottom 2c via the lower groove wall portion 2al. Therefore, the upper groove wall portion 2au is smoothly connected to the groove bottom 2c through the lower groove wall portion 2al, which makes it easier to rectify water flowing in the meandering main groove 21 and effectively suppresses groove bottom cracks that tend to occur in the groove bottom 2c, especially near both ends thereof in the tire width direction.

Furthermore, in this embodiment, the first groove wall 2a of the meandering main groove 21 has, in a tread surface view, the lower groove wall-top edge 2ale extending in a wavy line along the tire circumferential direction in order that the minimum groove wall angle portion Pamin and the maximum groove wall angle portion Pamax appear alternately at a predetermined repetition cycle along the tire circumferential direction; the upper groove wall-top edge 2ble of the second groove wall 2b of the meandering main groove 21 extends, in a tread surface view, in a wavy line along the tire circumferential direction; and the minimum groove wall angle portion Pamin of the first groove wall 2a of the meandering main groove 21 is located in the same position in the tire circumferential direction as the wide groove section Pwb of the meandering main groove 21, and the maximum groove wall angle portion Pamax of the first groove wall 2a of the meandering main groove 21 is located in the same position in the tire circumferential direction as the narrow groove section Pwn of the meandering main groove 21. These configurations make it easier to more effectively rectify water flowing in the meandering main groove 21.

In addition, in this embodiment, the upper groove wall-top edge 2aue of the first groove wall 2a of the meandering main groove 21 extends, in a tread surface view, in a straight line, a wavy line or a zigzag line along the tire circumferential direction with an amplitude in the tire width direction smaller than an amplitude in the tire width direction of the lower groove wall-top edge 2ale of the first groove wall 2a. This can control the variation in the compressive stiffness in the tire circumferential direction of the first land portion 31 forming the first groove wall 2a of the meandering main groove 21 (and thus, the entire land portion constituting the tread surface 1), and thus control the deterioration of the noise performance of the tire 10 due to at least one of the main grooves 2 being a meandering main groove.

As described above, according to this embodiment, it is possible to control the deterioration of noise performance while improving drainage performance.

In this embodiment, the upper groove wall-top edge 2aue of the first groove wall 2a of the meandering main groove 21 extends, in a tread surface view, in a straight line along the tire circumferential direction.

In this case, the variation in the compressive stiffness in the tire circumferential direction of the first land portion 31 forming the first groove wall 2a of the meandering main groove 21 (and thus, the entire land portion constituting the tread surface 1) can be controlled, and thus the deterioration of noise performance can be controlled more effectively. Also, in this case, the rubber flow during tire manufacturing (especially vulcanization molding) becomes uniform, leading to suppression of bearers and improvement of uniformity.

In this embodiment, as described above, the upper groove wall angle $\theta 2a$ (see FIG. 4A) at the maximum groove wall angle portion Pamax of the first groove wall 2a of the meandering main groove 21 may be 25° or less.

In this case, the cross-sectional area of the meandering main groove 21 will not be smaller than necessary, which, in turn, will ensure sufficient drainage performance and improve drainage performance more effectively.

In this embodiment, the upper groove wall-top edge 2bue of the second groove wall 2b of the meandering main groove 21 extends, in a tread surface view, in a wavy line along the tire circumferential direction.

In this case, it is easier to further rectify the water flowing in the meandering main groove 21, which in turn improves drainage performance more effectively.

In this embodiment, the amplitude in the tire width direction of the lower groove wall-top edge 2ale of the first groove wall 2a of the meandering main groove 21 is smaller than the amplitude in the tire width direction of the lower groove wall-top edge 2ble of the second groove wall 2b of the meandering main groove 21.

In this case, the cross-sectional area of the meandering main groove 21 will not be smaller than necessary, which, in turn, will ensure sufficient drainage performance and improve drainage performance more effectively.

In this embodiment, the tire 10 has a plurality of main grooves 2, and of the plurality of the main grooves 2, the meandering main groove is the outermost main groove 21 in the tire width direction on a vehicle-installed inside.

Since tires are usually mounted on a vehicle with negative camber, in many cases, the land portion on the vehicle-installed inside often has higher ground pressure than the land portion on the vehicle-installed outside. Therefore, as described above, by providing the meandering main groove on the outermost side in the tire width direction on the vehicle-installed inside, the hydroplaning phenomenon can be more effectively controlled, and thus drainage performance can be more effectively improved.

Other effects of this embodiment are described above.

Second Embodiment

Figure 6:
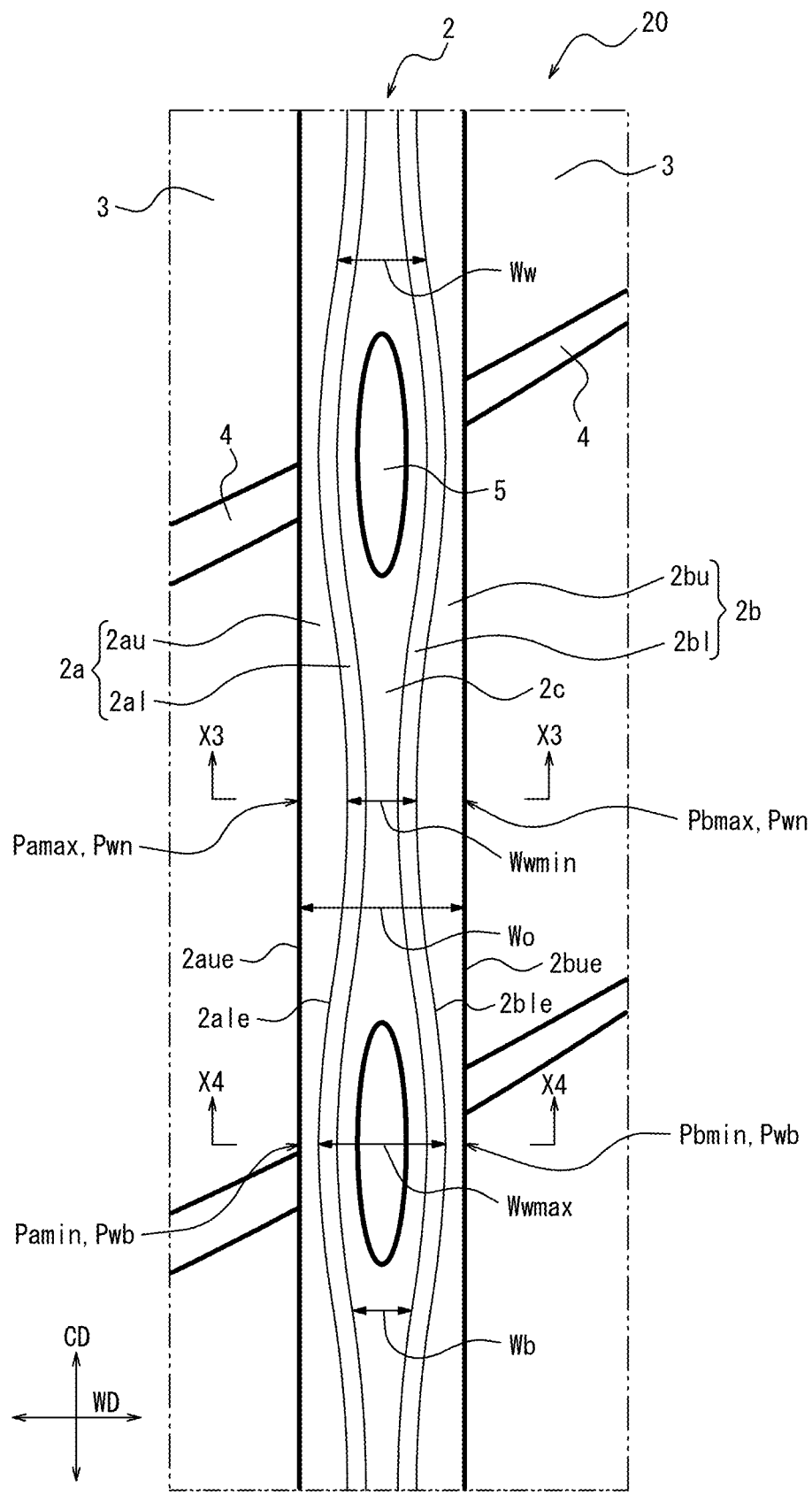
FIG. 6 is an enlarged development view similar to FIG. 3, illustrating a part of the tread surface of a tire according to the second embodiment of this disclosure.
Figure 7A:
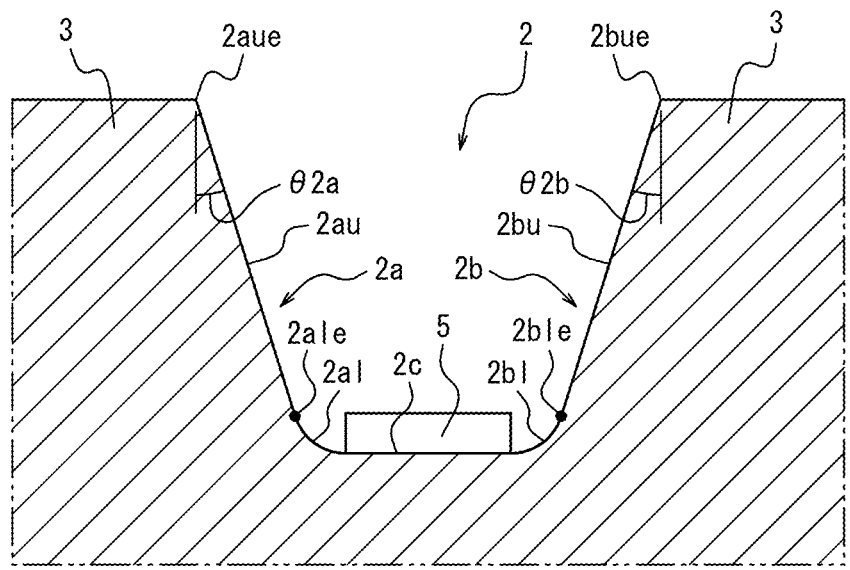
FIG. 7A is a cross-sectional view along the line X3-X3 in FIG. 6.
Figure 7B:
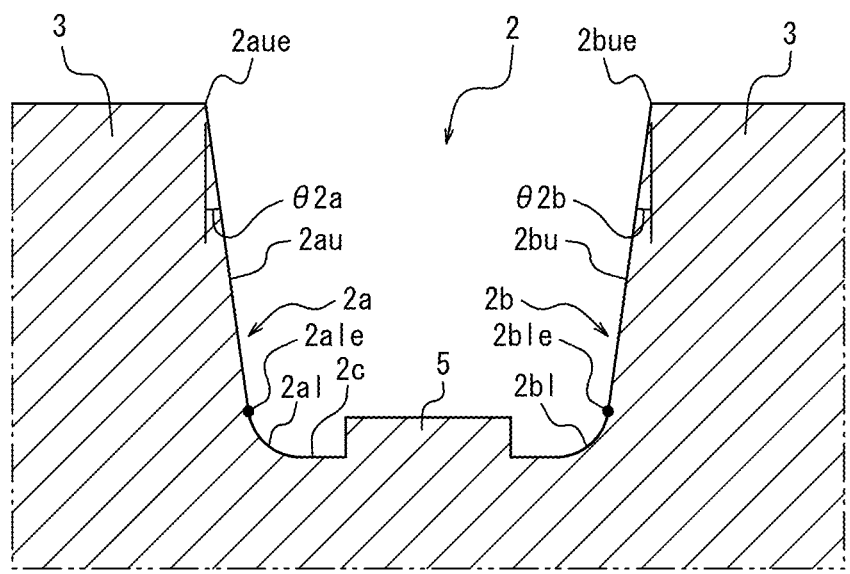
FIG. 7B is a cross-sectional view along the line X4-X4 in FIG. 6.

Next, a tire 20 according to the second embodiment of the present disclosure will be described with reference to FIGS. 6 to 7. FIG. 6 is an enlarged development view similar to FIG. 3, illustrating a part of the tread surface of the tire according to the second embodiment of this disclosure; FIG. 7A is a cross-sectional view along the line X3-X3 in FIG. 6; and FIG. 7B is a cross-sectional view along the line X4-X4 in FIG. 6. Here, in FIG. 6, for ease of understanding, the outlines of the two opening edges of the main groove 2, which is a meandering main groove (hereinafter, simply referred to as the "meandering main groove 2"), on the tread surface 1 and the ridges 5 are drawn with rather thick lines; and the rather thin lines between them in FIG. 6 are the edges (lines) formed by connecting the points, along the tire circumferential direction, where the curvature (and thus, the radius of curvature) changes in the tire widthwise cross-section. Note, that in FIG. 6, lateral grooves 4 are also drawn with a slightly thicker line.

For FIGS. 6 to 7, the same numerals/symbols as in FIGS. 1 to 5 are used for the same parts and components, etc. as in FIGS. 1 to 5, and their descriptions are omitted.

The tire 20 according to the second embodiment of the present disclosure differs from the tire 10 according to the first embodiment mainly in that the configuration of the meandering main groove 2 differs from the configuration of the meandering main groove 21 of the tire 10 according to the first embodiment of the present disclosure illustrated in FIGS. 2 to 5, and in other respects is substantially the same as the tire 10 of the first embodiment.

In the following, the second embodiment will be described, focusing on the points where it differs from the first embodiment.

The number of the circumferential main grooves 2 in the tire 20 of the second embodiment is the same as in the first embodiment, and the tire 20 should have at least one main groove.

Although not illustrated in the figure, the location of the meandering main groove 2 illustrated in FIG. 6 on the tread surface in this embodiment may be arbitrary. That is, for example, as in the first embodiment (see FIG. 2, etc.), of the plurality (for example, four) of the main grooves, the outermost main groove in the tire width direction on the vehicle-installed inside may be the meandering main groove 2. Instead of or in addition to this, at least one of the remaining main grooves may be the meandering main groove 2 illustrated in FIG. 6.

Furthermore, in this embodiment, as in the first embodiment, the configuration and presence or absence of the lateral groove 4 is optional, and in the example illustrated in FIG. 6, each of the land portions 3 on both sides forming the meandering main groove 2 has a lateral groove 4 that is connected to the meandering main groove 2.

In this embodiment, as illustrated in FIGS. 6, 7A, and 7B, the meandering main groove 2 is symmetrical with respect to the groove centerline, unlike the meandering main groove 21 of the first embodiment, in which the first groove wall 2a side and the second groove wall 2b side are formed asymmetrically with respect to each other.

More specifically, in this embodiment, as in the first embodiment (see FIGS. 3, 4A, and 4B), the first groove wall 2a of the meandering main groove 2 is configured so that the minimum groove wall angle portion Pamin, where the upper groove wall angle $\theta 2a$ is minimum, and the maximum groove wall angle portion Pamax, where the upper groove wall angle 62a is maximum, appear alternately at a predetermined repetition cycle along the tire circumferential direction. On the other hand, unlike the first embodiment, the second groove wall 2b of the meandering main groove 2 is also configured so that the minimum groove wall angle portion Pbmin, where the upper groove wall angle $\theta 2b$ is minimum, and the maximum groove wall angle portion Pbmax, where the upper groove wall angle 62b is maximum, appear alternately with a predetermined repetition cycle along the tire circumferential direction.

In this embodiment, as illustrated in FIG. 6, the above repetition cycle in which the upper groove wall angle 62a of the first groove wall 2a and the upper groove wall angle 62b of the second groove wall 2b change is the same as each other, which means that the minimum groove wall angle portion Pamin of the first groove wall 2a, the minimum groove wall angle portion Pbmin of the second groove wall 2b, and the wide groove section Pwb, in the meandering main groove 2, are located in the same position as each other in the tire circumferential direction, and the maximum groove wall angle portion Pamax of the first groove wall 2a, the maximum groove wall angle portion Pbmax of the second groove wall 2b, and the narrow groove section Pwn, in the meandering main groove 2, are located in the same position as each other in the tire circumferential direction. Furthermore, in this embodiment, the upper groove wall angle 62a of the first groove wall 2a and the upper groove wall angle 62b of the second groove wall 2b are identical to each other at each location in the tire circumferential direction. FIG. 7A illustrates a cross-sectional view in the tire width direction of the meandering main groove 2 at the maximum groove wall angle portion Pamax of the first groove wall 2*a*, and which in turn, at the maximum groove wall angle portion Pbmax of the second groove wall 2*b*, and FIG. 7B illustrates a cross-sectional view in the tire width direction of the meandering main groove 2 at the minimum groove wall angle portion Pamin of the first groove wall 2*a*, and which in turn, at the minimum groove wall angle portion Pbmin of the second groove wall 2*b*.

In this embodiment, as illustrated in FIG. 6, unlike the first embodiment (see FIG. 3), the amplitude in the tire width direction of the lower groove wall-top edge 2*ale* of the first groove wall 2*a* is the same as the amplitude in the tire width direction of the lower groove wall-top edge 2*ble* of the second groove wall 2*b*.

In addition, in this embodiment, as illustrated in FIG. 6, as in the first embodiment (see FIG. 3), the upper groove wall-top edge 2*aue* of the first groove wall 2*a* of the meandering main groove 2 extends, in a tread surface view, in a straight line along the tire circumferential direction, while, unlike the first embodiment, the upper groove wall-top edge 2*bue* of the second groove wall 2*b* of the meandering main groove 2 also extends, in a tread surface view, in a straight line along the tire circumferential direction. Note, that in this embodiment, the upper groove wall-top edge 2*aue* of the first groove wall 2*a* and the upper groove wall-top edge 2*bue* of the second groove wall 2*b* of the meandering main groove 2, respectively, may extend, in a tread surface view, in a wavy line or a zigzag line along the tire circumferential direction with an amplitude in the tire width direction smaller than the amplitude in the tire width direction of the lower groove wall-top edge 2*ale* of the first groove wall 2*a* or the lower groove wall-top edge 2*ble* of the second groove wall 2*b*, like the top edge 2*aue* of the first groove wall portion 2*a* of the meandering main groove 21 in the first embodiment.

In this embodiment, as illustrated in FIGS. 6, 7A, and 7B, the meandering main groove 2 has a ridge 5 at the groove bottom 2*c* that rises toward the outer side in the tire radial direction, as in the first embodiment. The ridge 5 is formed in the area including the wide groove section Pwb in the tire circumferential direction, as in the first embodiment. As in the first embodiment, the ridge 5 is formed in a shape that is longitudinal along the tire circumferential direction in a tread surface view. However, in this embodiment, as illustrated in FIGS. 7A and 7B, the cross-sectional shape of the ridge 5 in the tire width direction is formed in a square (rectangular) shape, unlike the first embodiment. Note, that in this embodiment, the dimensions, etc. of the ridge 5 may be the same as the ridge 5 in the first embodiment.

The tire 20 according to the second embodiment of the present disclosure, which is configured as described above, can also control the deterioration of noise performance while improving drainage performance in the same way as the tire 10 according to the first embodiment described above. Comparing the tire 10 of the first embodiment with the tire 20 of the second embodiment, in the tire 10 of the first embodiment of the above illustrated example, the entire second groove wall 2*b*, including the upper groove wall-top edge 2*bue*, extends in a wavy line along the tire circumferential direction in a tread surface view, making it easier to rectify water entering the meandering main groove 21, which in turn provides better drainage performance. On the other hand, in the tire 20 of the second embodiment of the illustrated example above, the upper groove wall-top edge 2*bue* of the second groove wall 2*b* also extends in a straight line along the tire circumferential direction in a tread surface view, like the upper groove wall-top edge 2*aue* of the first groove wall 2*a*, which reduces the variation in compressive stiffness in the tire circumferential direction and, in turn, makes it easier to control the deterioration of noise performance.

The above ridge 5 formed in the tire 20 of the second embodiment also make it easier for water that has entered the meandering main groove 2 to flow along the first and second groove walls 2*a* and 2*b* due to the ridge 5, which in turn can effectively improve drainage performance.

The other configuration and effects of the tire 20 of this embodiment are the same as those of the tire 10 of the first embodiment described above.

The above describes exemplary embodiments of the present disclosure, and various changes may be made without departing from the scope of the claims.

For example, the tire 10 of the first embodiment described above is a tire for which the vehicle mounting direction is specified by stamping on the tire or in the instruction manual, etc., but the tire of the present disclosure may be a tire for which the vehicle mounting direction is not specified.

In addition, for example, in the tire 10 of the first embodiment described above, the first groove wall 2*a*, whose upper groove wall angle changes, is positioned on the vehicle-installed inside and on the outer side in the tire width direction relative to the second groove wall 2*b*, however, the tire widthwise position of the first groove wall 2*a* and the second groove wall 2*b* may be reversed so that the first groove wall 2*a* is positioned on the vehicle-installed outside and on the inner side in the tire width direction relative to the second groove wall 2*b*.

INDUSTRIAL APPLICABILITY

The tires according to the present disclosure can be suitably used for any type of pneumatic tires, for example, passenger vehicle pneumatic tires, truck and bus pneumatic tires, etc.

REFERENCE SIGNS LIST 10, 20 Tire
1 Tread surface
2, 21, 22, 23, 24 Main groove
2*a* First groove wall
2*b* Second groove wall
2*c* Groove bottom
2*au*, 2*bu* Upper groove wall portion
2*aue*, 2*bue* Upper groove wall-top edge
2*al*, 2*bl* Lower groove wall portion
2*ale*, 2*ble* Lower groove wall-top edge
3, 31, 32, 33, 34, 35 Land portion
4, 41, 42, 43, 44, 45, 46, 47 Lateral groove
5 Ridge
CD Tire circumferential direction
CL Tire equatorial plane
D Groove depth
IN Vehicle-installed inside
Lr Length of ridge
Hr Height of ridge
OUT Vehicle-installed outside
Pamin, Pbmin Minimum groove wall angle portion
Pamax, Pbmax Maximum groove wall angle portion
Pwb Wide groove section
Pwn Narrow groove section TE Tread edge
WD Tire width direction
Wa Amplitude
Wb Width of groove bottom
Wr Width of ridge
Wo Groove opening width
Ww Groove wall spacing
Wwmin Minimum groove wall spacing
Wwmax Maximum groove wall spacing
θ2a, θ2b Upper groove wall angle

The invention claimed is:

1. A tire having one or more main grooves extending in a tire circumferential direction on a tread surface, wherein
at least one of the one or more main grooves is a meandering main groove in which at least part of groove surface extends, in a tread surface view, in a wavy line along the tire circumferential direction,
a first groove wall, which is a groove wall on one side in a tire width direction of the meandering main groove, and a second groove wall, which is a groove wall on the other side in the tire width direction of the meandering main groove, each has in a tire widthwise cross-section an upper groove wall portion extending from the tread surface in a straight line or in an arc of a constant curvature with a center of curvature on the groove side, and a lower groove wall portion extending in an arc of a constant curvature, which is larger than that of the upper groove wall portion, with a center of curvature on the groove side and is connected to the upper groove wall portion, and the upper groove wall portion is connected to a groove bottom via the lower groove wall portion,
when, in a tire widthwise cross-section, a groove wall angle of the upper groove wall portion on the tread surface relative to a normal line on the tread surface is referred to as an upper groove wall angle; an edge formed by connecting top ends, each of which is in the upper groove wall portion in a tire widthwise cross-section, to the tire circumferential direction, and an edge formed by connecting boundaries, each of which is between the upper groove wall portion and the lower groove wall portion in a tire widthwise cross-section, to the tire circumferential direction are referred to as an upper groove wall-top edge and a lower groove wall-top edge, respectively; and furthermore, a distance in the tire width direction between the lower groove wall-top edges in both of the groove walls of the meandering main groove is referred to as a groove wall spacing,
the first groove wall of the meandering main groove has, in a tread surface view, the lower groove wall-top edge extending in a wavy line along the tire circumferential direction in order that a minimum groove wall angle portion where the upper groove wall angle is minimum and a maximum groove wall angle portion where the upper groove wall angle is maximum appear alternately at a predetermined repetition cycle along the tire circumferential direction,
the second groove wall of the meandering main groove has, in a tread surface view, the lower groove wall-top edge extending in a wavy line along the tire circumferential direction,
the minimum groove wall angle portion of the first groove wall of the meandering main groove and a wide groove section of the meandering main groove where the groove wall spacing is maximum are located at the same position in the tire circumferential direction, and the maximum groove wall angle portion of the first groove wall of the meandering main groove and a narrow groove section of the meandering main groove where the groove wall spacing is minimum are located at the same position in the tire circumferential direction,
in a tread surface view, the upper groove wall-top edge of the first groove wall of the meandering main groove extends in a straight line, a wavy line or a zigzag line along the tire circumferential direction with an amplitude in the tire width direction smaller than an amplitude in the tire width direction of the lower groove wall-top edge of the first groove wall, and
an amplitude in the tire width direction of the lower groove wall-top edge of the first groove wall of the meandering main groove is smaller than an amplitude in the tire width direction of the lower groove wall-top edge of the second groove wall of the meandering main groove.

2. The tire according to claim 1, wherein the upper groove wall-top edge of the first groove wall of the meandering main groove extends, in a tread surface view, in a straight line along the tire circumferential direction.

3. The tire according to claim 2, wherein the upper groove wall angle in the maximum groove wall angle portion of the first groove wall of the meandering main groove is 25° or less.

4. The tire according to claim 3, wherein the upper groove wall-top edge of the second groove wall of the meandering main groove extends, in a tread surface view, in a wavy line along the tire circumferential direction.

5. The tire according to claim 2, wherein the upper groove wall-top edge of the second groove wall of the meandering main groove extends, in a tread surface view, in a wavy line along the tire circumferential direction.

6. The tire according to claim 2, having a plurality of the main grooves, and
of the plurality of the main grooves, the meandering main groove is the outermost main groove in the tire width direction on a vehicle-installed inside.

7. The tire according to claim 1, wherein the upper groove wall angle in the maximum groove wall angle portion of the first groove wall of the meandering main groove is 25° or less.

8. The tire according to claim 7, wherein the upper groove wall-top edge of the second groove wall of the meandering main groove extends, in a tread surface view, in a wavy line along the tire circumferential direction.

9. The tire according to claim 7, having a plurality of the main grooves, and
of the plurality of the main grooves, the meandering main groove is the outermost main groove in the tire width direction on a vehicle-installed inside.

10. The tire according to claim 1, wherein the upper groove wall-top edge of the second groove wall of the meandering main groove extends, in a tread surface view, in a wavy line along the tire circumferential direction.

11. The tire according to claim 10, having a plurality of the main grooves, and
of the plurality of the main grooves, the meandering main groove is the outermost main groove in the tire width direction on a vehicle-installed inside.

12. The tire according to claim 1, having a plurality of the main grooves, and of the plurality of the main grooves, the meandering main groove is the outermost main groove in the tire width direction on a vehicle-installed inside.

13. A tire having one or more main grooves extending in a tire circumferential direction on a tread surface, wherein at least one of the one or more main grooves is a meandering main groove in which at least part of groove surface extends, in a tread surface view, in a wavy line along the tire circumferential direction, a first groove wall, which is a groove wall on one side in a tire width direction of the meandering main groove, and a second groove wall, which is a groove wall on the other side in the tire width direction of the meandering main groove, each has in a tire widthwise cross-section an upper groove wall portion extending from the tread surface in a straight line or in an arc of a constant curvature with a center of curvature on the groove side, and a lower groove wall portion extending in an arc of a constant curvature, which is larger than that of the upper groove wall portion, with a center of curvature on the groove side and is connected to the upper groove wall portion, and the upper groove wall portion is connected to a groove bottom via the lower groove wall portion, when, in a tire widthwise cross-section, a groove wall angle of the upper groove wall portion on the tread surface relative to a normal line on the tread surface is referred to as an upper groove wall angle; an edge formed by connecting top ends, each of which is in the upper groove wall portion in a tire widthwise cross-section, to the tire circumferential direction, and an edge formed by connecting boundaries, each of which is between the upper groove wall portion and the lower groove wall portion in a tire widthwise cross-section, to the tire circumferential direction are referred to as an upper groove wall-top edge and a lower groove wall-top edge, respectively; and furthermore, a distance in the tire width direction between the lower groove wall-top edges in both of the groove walls of the meandering main groove is referred to as a groove wall spacing, the first groove wall of the meandering main groove has, in a tread surface view, the lower groove wall-top edge extending in a wavy line along the tire circumferential direction in order that a minimum groove wall angle portion where the upper groove wall angle is minimum and a maximum groove wall angle portion where the upper groove wall angle is maximum appear alternately at a predetermined repetition cycle along the tire circumferential direction, the second groove wall of the meandering main groove has, in a tread surface view, the lower groove wall-top edge extending in a wavy line along the tire circumferential direction, the minimum groove wall angle portion of the first groove wall of the meandering main groove and a wide groove section of the meandering main groove where the groove wall spacing is maximum are located at the same position in the tire circumferential direction, and the maximum groove wall angle portion of the first groove wall of the meandering main groove and a narrow groove section of the meandering main groove where the groove wall spacing is minimum are located at the same position in the tire circumferential direction, in a tread surface view, the upper groove wall-top edge of the first groove wall of the meandering main groove extends in a straight line, a wavy line or a zigzag line along the tire circumferential direction with an amplitude in the tire width direction smaller than an amplitude in the tire width direction of the lower groove wall-top edge of the first groove wall, the upper groove wall-top edge of the first groove wall of the meandering main groove extends, in a tread surface view, in a straight line along the tire circumferential direction, and the upper groove wall-top edge of the second groove wall of the meandering main groove extends, in a tread surface view, in a wavy line along the tire circumferential direction.

14. The tire according to claim 13, wherein the upper groove wall angle in the maximum groove wall angle portion of the first groove wall of the meandering main groove is 25° or less.

* * * * *